United States Patent [19]

Davis et al.

[11] Patent Number: 5,054,873

[45] Date of Patent: Oct. 8, 1991

[54] HIGH DENSITY INTEGRATED OPTICAL MULTIPLEXER/DEMULTIPLEXER

[75] Inventors: Richard L. Davis, Redondo Beach; Harold M. Stoll, Rancho Palos Verdes, both of Calif.

[73] Assignee: Northrop Corporation, Hawthorne, Calif.

[21] Appl. No.: 444,908

[22] Filed: Dec. 4, 1989

[51] Int. Cl.$^5$ ................................................ G02B 6/10
[52] U.S. Cl. ...................................... 385/27; 385/132; 359/127
[58] Field of Search ............... 350/96.11, 96.12, 96.13, 350/96.14, 96.15

[56] References Cited

U.S. PATENT DOCUMENTS

| | | | |
|---|---|---|---|
| 4,390,236 | 6/1983 | Alferness | 350/384 X |
| 4,711,515 | 12/1987 | Alferness | 350/96.13 X |
| 4,775,207 | 10/1988 | Siliberberg | 350/96.14 |
| 4,904,030 | 2/1990 | Soref | 350/96.13 X |

OTHER PUBLICATIONS

Maltenfort, "Integrated Optic Wavelength-Division Multiplexing System for Optical Fiber Communication Systems", *Proceedings of the SPIE*, vol. 704, pp. 152–159, 1986.

Laude, Gautherin, Philips and Lerner, "High-Performance Eight-Channel Multiplexer/Demultiplexer for Monomode Fibers", *Technical Digest of the Conference on Lasers and Electro-Optics*, Paper THK20, pp. 288–289, 1986.

Katoh, Tachikawa, Oguchi and Fujii, "Three-Channel Wavelength-Division-Multiplexing Transceiver Module Assembled Without an Adjustment Process", ibid., Paper THS5, pp. 332–333.

Kazarinov, Henry and Olsson, "Narrow-Band Resonant Optical Reflectors and Resonant Optical Transformers for Laser Stabilization and Wavelength Division Multiplexing", *IEEE Journal of Quantum Electronics*, vol. QE-23, No. 9, pp. 1419–1425, 1987.

Alferness and Buhl, "Tunable Electro-Optic Waveguide TE<->TM Converter/Wavelength Filter", *Applied Physics Letters*, vol. 40, pp. 861–862, 1982.

Kondo, Miyazaki and Akao, "Optical Tunable Switched Directional Couplers Consisting of Two Thin-Film Waveguides Using Surface Acoustic Waves", *Japanese Journal of Applied Physics*, vol. 17, No. 7, pp. 1231–1243, Jul. 1978.

Kino and Wagers Entitled "Theory of Interdigital Couplers on Nonpiezoelectric Substrates", *Journal of Applied Physics*, vol. 44, No. 4, p. 1480 (1973).

*Primary Examiner*—Frank Gonzalez
*Assistant Examiner*—Phan T. Heartney
*Attorney, Agent, or Firm*—Terry J. Anderson; Robert B. Block

[57] ABSTRACT

A tunable, integrated WDM optic couler for coupling optical energy to and from channel waveguides in response to the application of Surface Acoustic Waves (SAW's), and a distributed processor computer control system utilizing the couplers. A first range of SAW's is used to couple optical energy of selected wavelengths from a channel waveguide driven by a LED to multiplex optical energy to a common optic loop and a second, non-overlapping range of SAW's is used to couple optical energy from the loop to a second channel waveguide. The second, receiving channel waveguide includes a Bragg deflector, planar waveguide and photodetector arrays to demultiplex the optical energy by focusing selected wavelengths of optical energy on selected portions of the photodetector arrays. Changes in the acoustic wavelengths and amplitudes permit tuning of the coupler and computer system by altering the portion and wavelengths, respectively, of optical energy coupled by each section of each coupler.

27 Claims, 2 Drawing Sheets

HIGH DENSITY INTEGRATED OPTICAL MULTIPLEXER/DEMULTIPLEXER

BACKGROUND OF THE INVENTION

1. Field of the Invention

This invention relates to fiber optic devices for coupling signals to and from fiber optic cables used for the transmission of digital and analog data. In particular, this invention relates to a Wavelength Division Multiplexer (WDM) multiplexing and demultiplexing fiber optic switch and coupler useful for interconnecting processors at various sites linked by an optical fiber and to distributed processor systems configured therefrom.

2. Description of the Prior Art

Conventional optical couplers use various techniques for coupling one or more channels of signal information to and between fiber optic waveguides.

Maltenfort, in "Integrated Optic Wavelength-Division Multiplexing System for Optical Fiber Communication Systems", *Proceedings of the SPIE*, vol. 704, pp. 152-159, 1986, proposes a WDM design using waveguide lenses and a diffraction grating to permit multiple channel coupling. In the demultiplexing mode, optical energy including multiple wavelengths of light are applied from a fiber optic waveguide at an angle to a planar periodic diffraction grating used as a dispersive element. The different wavelengths are thereby separately focused on each of a series of photodetectors in an array. In the multiplexing mode, light of different wavelengths from an array of LED's is focused on the diffraction grating so that the combined result may be applied to the fiber optic waveguide.

Laude, Gautherin, Philips and Lerner, in "High-performance eight-channel multiplexer/demultiplexer for monomode fibers," *Technical Digest of the Conference on Lasers and Electro-Optics*, paper THK20, pp. 288-289, 1986 describes a WDM optic coupler using a diffraction grating and concave mirror. In the demultiplexing function, the light from a single fiber optic waveguide is separated by the diffraction grating into its component wavelengths which are then applied by the concave mirror to the appropriate one of eight output waveguides. The multiplexing function operates the system in reverse.

Katoh, Tachikawa, Oguchi and Fujii, in "Three-channel wavelength-division-multiplexing transceiver module assembled without an adjustment process", ibid., paper THS5, pp. 332-333, proposes an easy to assemble WDM micro-optic device using a glass block with interference filters to separate light of different wavelengths to or from a lens terminated fiber optic waveguide.

Kazarinov, Henry and Olsson, in "Narrow-Band Resonant Optical Reflectors and Resonant Optical Transformers for Laser Stabilization and Wavelength Division Multiplexing," *IEEE Journal of Quantum Electronics*, vol QE-23, no. 9, pp. 1419-1425, 1987, propose a WDM optic coupler in which a high-Q, distributed BRAGG resonator is coupled between a pair of waveguides in an integrated optical circuit to inject many closely spaced wavelength signals into a single waveguide.

Alferness and Buhl, in "Tunable electro-optic waveguide TE<—>TM converter/wavelength filter", *Applied Physics Letters*, vol. 40, pp. 861-862, 1982 report an electrically tunable integrated electro-optic circuit wavelength filter and propose its utility for WDM optic devices.

Kondo, Miyazaki and Akao, in "Optical Tunable Switched Directional Couplers Consisting of Two Thin-Film Waveguides Using Surface Acoustic Waves", *Japanese Journal of Applied Physics*, vol. 17, No. 7, pp. 1231-1243, July 1978, analyze the effect of a Surface Acoustic Wave (SAW) on the coupling of optical power between parallel thin film planar waveguides in an acousto-optic tunable switched directional coupler. The optical center wavelength of the controllable range can be tuned by the SAW frequency and the fraction of the optical power transferred can be controlled by adjusting the SAW amplitude for different optical wavelengths independently. The switched directional couplers using SAW's discussed in this paper are proposed for application in tunable lasers, tunable filters or optical wave separators in integrated optic devices and would be useful in WDM technology.

None of the conventional devices combine the necessary characteristics for a WDM optic coupler in a large, distributed processor multiprocessor computer system linked by a common fiber optic path.

The desired device would provide high density multiplexing to maximize the system's data handling capacity by providing a channel for each of the hundreds of processors potentially connected to a large system. The desired device would also provide bidirectional, independent, multichannel interfacing capabilities at each site and be capable of convenient assignment and reassignment of both transmit and receive wavelengths.

The required interface should also be capable of a transparent failure mode, that is, in the event of a failure of any given interface, data transmission on the fiber as well as the bidirectional coupling of the other interface devices on the system would not be interrupted.

SUMMARY OF THE INVENTION

A high density, bidirectional, multichannel integrated optic coupler, which may be constructed on a single chip and used to connect computers, sensors and other peripheral devices to a fiber optic bus to interconnect and/or form a distributed processors computer system is disclosed. The coupler includes independent receive and transmit circuits which have channel waveguides with propagation characteristics dissimilar from the common optic loop.

Independent series of SAW's applied to the coupler circuits selectively couple optical energy permitting WDM operation by phase matching the guides independently at selected optic wavelengths. Multiplexing is accomplished by applying multiple SAW's to the transmit circuit driven by an LED operated at the appropriate optical wavelengths. Demultiplexing is accomplished by applying a non-overlapping range of multiple SAW's to the receive circuit to couple the appropriate optical wavelengths to Bragg deflectors and planar waveguides which apply the appropriate wavelengths of optic energy separately to selected photodetectors in a photodetector array.

Changes in the applied SAW's permit tuning of the couplers and resultant computer system by changing the portion and or wavelengths of the optical energy coupled between the waveguides thereby.

DETAILED DESCRIPTION OF THE PREFERRED EMBODIMENT(S)

Figure 1:
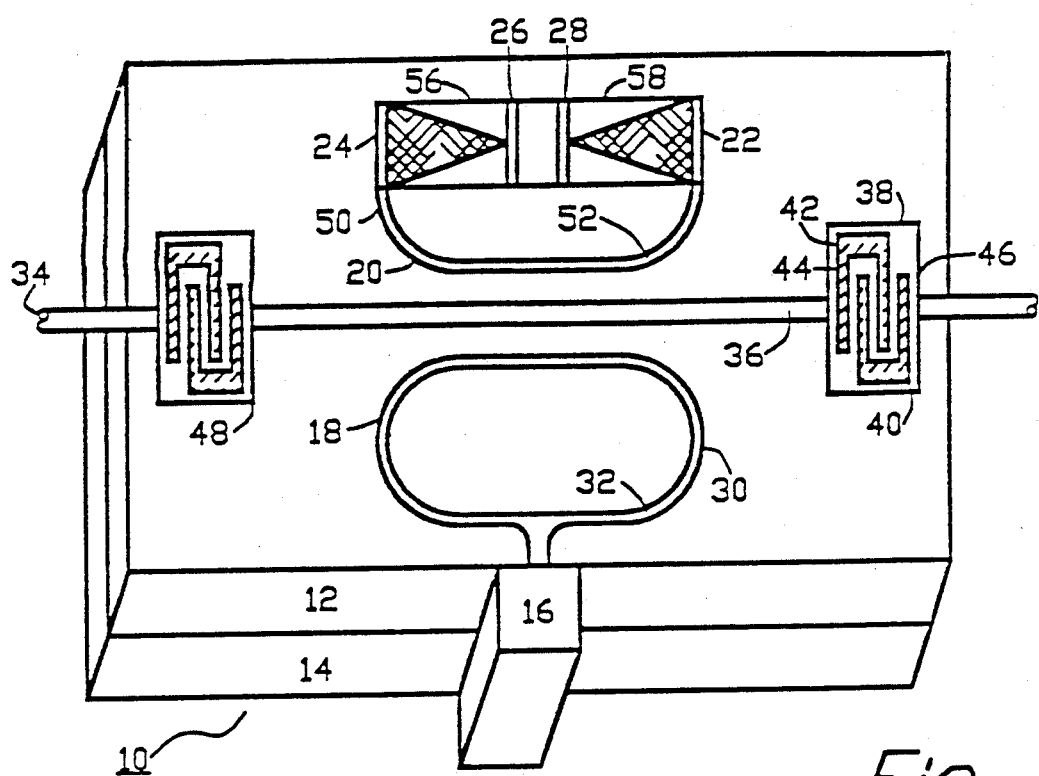
FIG. 1 is a plan view of optical coupler 10 according the present invention.

FIG. 1 is a plan view of optical coupler 10 according to the present invention fabricated, according to known planar processing techniques, on surface or buffer layer 12 which may, for example, be a layer of silicon dioxide which has been grown on the surface of silicon substrate 14. Buffer layer 12 may conveniently be between 5 and 10 microns in thickness depending upon the waveguide material positioned on it. After the various channel waveguides and other devices discussed below (except the interdigital electrodes) are added to the top surface of buffer layer 12, a cladding layer not shown is added in accordance with conventional practice.

Optical coupler 10 includes a broad-band optical source such as LED 16; tunable, acousto-optic, wavelength selective couplers 18 and 20; focusing, distributed-BRAGG-deflectors 22 and 24; and photodetector arrays 26 and 28. LED 16 may conveniently be a commercially available, broad spectrum light source capable of modulation rates on the order of 50 Mhz.

Transmit coupler 18 includes input channel waveguide 30 which may conveniently be fabricated from a conventional, optically transparent dielectric material shown as input channel dielectric material 32 in FIG. 1. Input channel dielectric material 32 should be selected, as will be explained below in greater detail with reference to FIG. 4, so that its refractive index $n_2$ is greater than refractive index $n_1$ of buffer layer 12.

A substantial portion of input channel waveguide 30 is fabricated on buffer layer 12 to lie in parallel with fiber-channel waveguide 34, the operation of which is discussed below in more detail with respect to FIG. 2. Fiber-channel waveguide 34 may conveniently be fabricated from a conventional, optically transparent dielectric material shown as waveguide dielectric material 36 in FIG. 1.

Waveguide dielectric material 36 should also be selected so that its refractive index $n_3$ is greater than refractive index $n_1$ of buffer layer 12. Waveguide dielectric material 36 is not necessarily the same material as input channel dielectric material 32.

Transmit coupler 18 also includes transmit Surface Acoustic Wave (SAW) transducer 38 which includes electrodes 40 and 42 arranged in interdigital pattern 44 on piezo-electric material 46. Piezo-electric material 46 may conveniently be configured from a 2 micron thick layer of zinc oxide sputter deposited on the cladding layer, not shown. Electrodes 40 and 42 may conveniently be created by aluminum deposition.

Electrodes 40 and 42 are connected to a signal source, not shown, operated at a selected acoustic frequency and serve to activate piezo-electric material 46 to apply a SAW to buffer layer 12 at that acoustic frequency. Acoustic frequencies in the approximate range of 160 to 200 Mhz. would be convenient for use in this application.

The operation of transmit SAW transducer 38, as well as that of receive SAW transducer 48 discussed herein below, may be understood in greater detail from the article by Kondo, Miyazaki and Akao discussed above as well as in an article by Kino and Wagers entitled "Theory of Interdigital Couplers on Nonpiezoelectric Substrates," *Journal of Applied Physics*, vol. 44, no. 4, p. 1480 (1973).

Similarly, receive coupler 20 includes output channel waveguide 50 which may conveniently be fabricated from a conventional, optically transparent dielectric material shown as output channel dielectric material 52 in FIG. 1. Output channel dielectric material 52 should be selected, as will be explained below in greater detail with reference to FIG. 4, so that its refractive index $n_4$ is greater than refractive index $n_1$ of buffer layer 12.

Input channel waveguide 30 and output channel waveguide 50 have substantially dissimilar optical propagation characteristics from fiber-channel waveguide 34 and must be dissimilar from each other. In a particular embodiment of optical coupler 10, fiber-channel waveguide 34 could for example conveniently be constructed from a phosphorus doped glass having a refractive index of 1.46 while input channel waveguide 30 and output channel waveguide 50 could be fabricated from Corning 7059 glass having a refractive index of 1.54.

Alternatively, the same material could be used for all three waveguides while the propagation characteristics of the waveguides could be made dissimilar by varying the physical configurations such as the dopant levels, the cross sectional areas and or the aspect ratios of the channels.

A substantial portion of output channel waveguide 50 is fabricated on buffer layer 12 to lie in parallel with fiber-channel waveguide 34, the operation of which is discussed below in more detail with respect to FIG. 2. Receive coupler 20 includes receive SAW transducer 48 similar in construction and operation to transmit SAW transducer 38 discussed above.

The ends of output channel waveguide 50 are connected by distributed-BRAGG-deflectors 22 and 24 which are in turn connected by planar waveguides 56 and 58 to photodetector arrays 26 and 28, respectively. Photodetector arrays 26 and 28 each consist of an array, typically a linear array, of photodetectors. Each such detector is separately optically and electrically operable.

BRAGG deflector 22 consists of a plurality of grooves or other perturbations that intersect output channel waveguide 50 at a selected, particular angle to disperse optical signals therefrom into planar waveguide 58.

As known in the art, the spacing between the grooves of BRAGG deflector 22 vary as a function of the groove's position with respect to the end of output channel waveguide 50 thereby causing the dispersed light to converge to a focus on photodetector array 28.

The location of a particular focused spot on photodetector array 28 depends upon the wavelength of the optical signal dispersed into planar waveguide 58 from output channel waveguide 50. If multiple optical wavelengths are present in output channel waveguide 50, then each wavelength component is focused onto a different element or photodetector of photodetector array 28.

BRAGG deflector 24 similarly consists of a plurality of grooves that intersect output channel waveguide 50 at a selected, particular angle to disperse optical signals therefrom into planar waveguide 56. The grooves of BRAGG deflector 24 cause the dispersed light to converge to a focus on photodetector array 26. If multiple optical wavelengths are present in output channel waveguide 50, then each wavelength component is focused onto a different element or photodetector of photodetector array 26.

Figure 2:
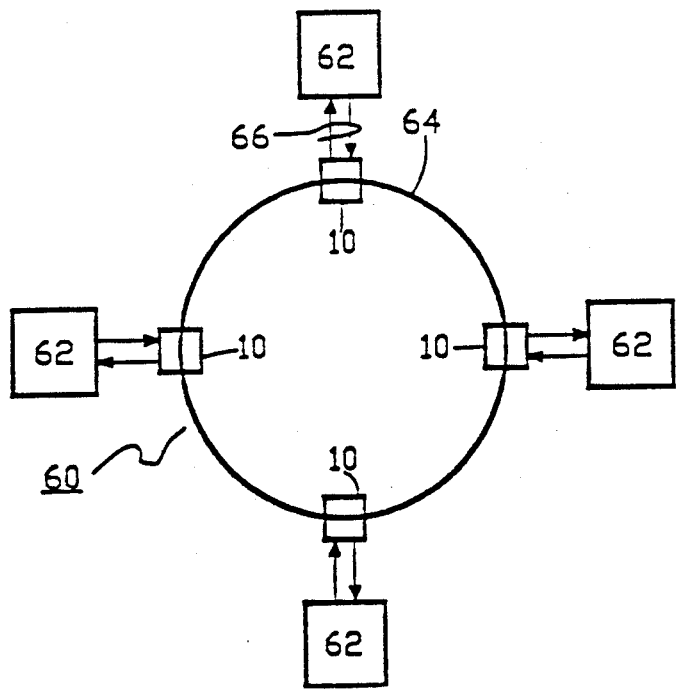
FIG. 2 is a simplified schematic of a distributed processor computer system where each processor is interconnected with the common fiber optic data transmission path by a coupler according to the present invention.

FIG. 2 is a simplified schematic of distributed processor computer system 62 where each processor 62 is interconnected with common fiber optic data transmission loop 64 by an optical coupler 10 according to the present invention.

Common fiber optic data transmission loop 64 consists of the required lengths of fiber optic waveguide between each optical coupler 10 and fiber-channel waveguide 34 within each optical coupler 10 which all together form a continuous optical waveguide.

A pair of electrical connections 66 are shown in FIG. 2 to illustrate the various electrical connections between each processor 62 and its corresponding optical coupler 10. The exact nature of these connections will depend upon the specific configuration of the processors and couplers used in distributed processor computer system 60, but serve to connect transmit coupler 18 and receive coupler 20 of each optical coupler 10 to its corresponding processor 62.

With regard now to transmit coupler 18 shown in FIG. 1, electrical connections 66 must provide connection between processor 62 and transmit coupler 18 to operate LED 16 so that its optical intensity is a function of the data signal that must be transmitted from processor 62 to common fiber optic data transmission loop 64.

In addition, electrical connections 66 must provide the electrical signals required by transmit SAW transducer 38 to create the appropriate SAW's, discussed below with reference to the remaining Figures, necessary to permit coupling of desired optical signals between input channel waveguide 30 and fiber-channel waveguide 34.

With regard now to receive coupler 20 also shown in FIG. 1, electrical connections 66 must provide connection between processor 62 and receive coupler 20 to permit processor 62 to detect the intensity of the light applied to the elements of photodetector arrays 26 and 28 to determine the data signal that must be transmitted from common fiber optic data transmission loop 64 to processor 62.

In addition, electrical connections 66 must provide the electrical signals required by receive SAW transducer 48 to create the appropriate SAW's, discussed below with reference to the remaining Figures, necessary to permit coupling of desired optical signals between fiber-channel waveguide 34 and output channel waveguide 50.

Distributed processor computer system 60 permits each processor 62 to transmit data to and receive data from another processor 62. Optical coupler 10 provides wavelength division multiplexing and demultiplexing and independent transmit and receive capabilities. That is, each optical coupler 10 permits each processor 62 to transmit data by inserting the data on common fiber optic data transmission loop 64 at one or more wavelengths while simultaneously and independently receiving data by extracting that data from common fiber optic data transmission loop 64 at one or more wavelengths.

The system design permitted by the configuration of optical coupler 10 has several substantial advantages. In particular, the one or more wavelengths assigned for receive as well as for transmit functions can all be readily and rapidly changed. In addition, in the event of a failure of operation of any given optical coupler 10, all remaining data transmission on common fiber optic data transmission loop 64 will continue uninterrupted.

Figure 3:
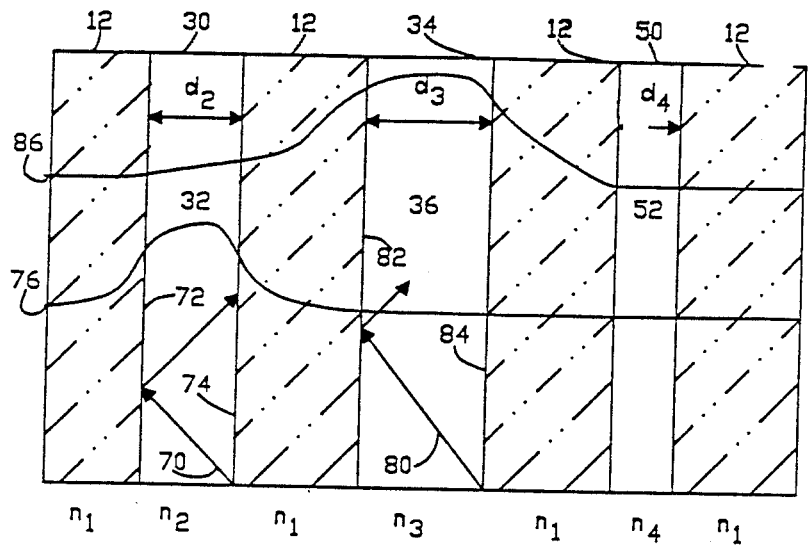
FIG. 3 is a representational cross sectional view of channel waveguides 30, 34 and 50 on buffer layer 12 of optical coupler 10 illustrating the distribution of signal energy in the channel waveguides in the absence of Surface Acoustic Waves.

FIG. 3 is a representational cross sectional view of channel waveguides 30, 34 and 50 on buffer layer 12 of optical coupler 10 illustrating the distribution of signal energy in the channel waveguides in the absence of Surface Acoustic Waves.

As shown in FIG. 3, input channel waveguide 30 consists of a guiding region formed of input channel dielectric material 32 whose refractive index $n_2$ is greater than refractive index $n_1$ of the surrounding medium buffer layer 12. Light energy, shown for convenience of discussion in the form of optical ray 70 within input channel waveguide 30, would experience substantial internal reflection at boundaries 72 and 74 between input channel dielectric material 32 and buffer layer 12. This reflection serves to maintain most of the optical energy associated with optical ray 70 within input channel waveguide 30.

Optical energy line 76 is a graphical depiction of the distribution of the energy of optical ray 70 within input channel dielectric material 32 and the immediately surrounding medium of buffer layer 12 for a normal mode of operation of input channel waveguide 30. It is important to note that some fraction of the optical energy of optical ray 70 of the normal mode lies within buffer layer 12 surrounding input channel dielectric material 32.

Fiber-channel waveguide 34 is formed by waveguide dielectric material 36 surrounded by buffer layer 12. Fiber-channel waveguide 34 is another guiding region whose refractive index $n_3$ is also greater than refractive index $n_1$ of buffer layer 12. The diameter or width $d_3$ of fiber-channel waveguide 34 is chosen to be greater than the diameter or width $d_2$ of input channel waveguide 30.

Light energy in the form of optical ray 80 within fiber-channel waveguide 34, experiences substantial internal reflection at boundaries 82 and 84 between input channel dielectric material 34 and buffer layer 12. This reflection serves to maintain most of the optical energy associated with optical ray 80 within waveguide 34.

Optical energy line 86 is a graphical depiction of the distribution of the energy of optical ray 80 within waveguide dielectric material 36 and the immediately surrounding medium of buffer layer 12 for a normal mode of operation of fiber-channel waveguide 34. It is important to note that some fraction of the optical energy of optical ray 80 of the normal mode lies within buffer layer 12 surrounding Waveguide dielectric material 36.

Optical coupler 10 is intentionally designed so that waveguide dielectric material 36 is positioned near enough to input channel dielectric material 32 so that at least some portion of the energy of optical ray 70 overlaps optical ray 80, that is, optical energy line 76 overlaps optical energy line 86 where both energies are non-zero.

Without the presence of some external mechanism, such as an appropriate SAW, discussed below, the relative indices of refraction and the spatial relationship between input channel waveguide 30 and fiber-channel Waveguide 34 have been chosen so that there is no significant energy transferred between the waveguides. In order to exchange useful amounts of energy between the waveguides, they must be phase matched so that the propagation constants are at least nearly equal. The SAW, under the appropriate conditions, provides this equality and permits optical energy to be coupled from input channel waveguide 30 to fiber-channel waveguide 34.

The propagation constant, $\beta$, for an optical wave in input channel waveguide 30 is given by the following equation:

$$\beta = \frac{n_{eff} 2\pi}{\lambda}$$

where $\lambda$ is the optical wavelength in input channel dielectric material 32, $\lambda$ is the optical wavelength and $n_{eff}$ is the effective index of the guided mode. The value of $n_{eff}$ is dependent upon the frequency of the light, the refractive indices of input channel dielectric material 32 and buffer layer 12 and the dimensions, especially width $d_2$, of input channel waveguide 30.

As is known in the art, under certain selected circumstances, where for example refractive index $n_3$ is greater than refractive index $n_2$ and width $d_3$ is less than width $d_2$, there may be an optical wavelength at which the propagation constants of input channel waveguide 30 and fiber-channel waveguide 34 are sufficiently close so that optical energy is transferred there between.

In the case of the present invention, however, where refractive index $n_3$ is greater than refractive index $n_2$ but width $d_3$ is greater than width $d_2$, energy exchange only occurs if some external mechanism, such as an acoustic wave, is applied to the waveguides that compensates for the propagation constant mismatch.

As shown in FIG. 3, output channel waveguide 50 consists of a guiding region formed of output channel dielectric material 52 whose refractive index $n_4$ is greater than refractive index $n_1$ of the surrounding medium buffer layer 12. The diameter or width $d_3$ of fiber-channel waveguide 34 is chosen to be greater than the diameter or width $d_4$ of output channel waveguide 50.

As noted above with respect to the relationship between fiber-channel waveguide 34 and input channel waveguide 30, optical energy line 86 is a graphical depiction of the distribution of the energy of optical ray 80 within waveguide dielectric material 36 and the immediately surrounding medium of surface layer 12 for a normal mode of operation of fiber-channel waveguide 34. It is important to note that some fraction of the optical energy of optical ray 80 of the normal mode lies within the portion of buffer layer 12 between waveguide dielectric material 36 and output channel dielectric material 52.

Optical coupler 10 is intentionally designed so that waveguide dielectric material 36 is positioned near enough to output channel dielectric material 52 so that in the presence of some external mechanism, such as an appropriate SAW, discussed below, optical energy may be coupled from fiber-channel waveguide 34 to output channel waveguide 50.

Figure 4:
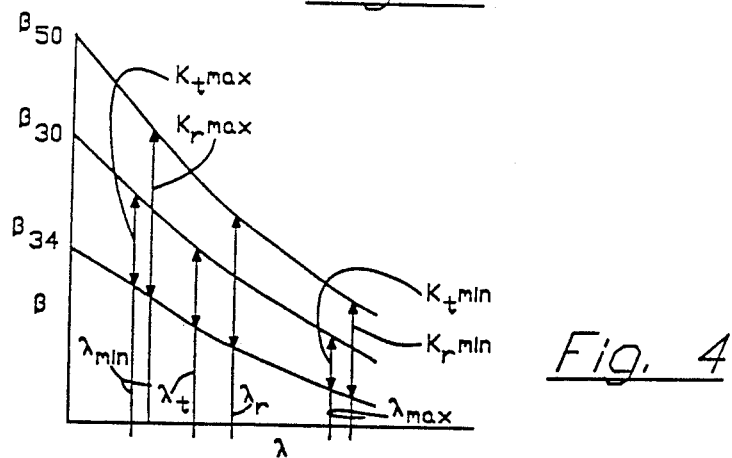
FIG. 4 is a graph of the optical propagation constant $\beta$ as a function of optical free space wavelength $\lambda$ for a waveguide system according to the present invention which illustrates the effect of a selection of a series of SAW wavelengths that permit independent transfers of optical energy for both transmit and receive operations.

FIG. 4 is a graph of the optical propagation constant $\beta$ as a function of optical free space wavelength $\lambda$ for a waveguide system according to the present invention which illustrates the effect of a selection of a series of SAW wavelengths which permit independent transfers of optical energy for both transmit and receive operations.

For a particular SAW, having an acoustic wavelength of $\Lambda$, the SAW propagation constant $\kappa$ may be calculated as follows:

$$\kappa = \frac{2\pi}{\Lambda}.$$

As noted above, optical energy may only be transferred between input channel waveguide 30 and fiber-channel waveguide 34 under conditions of relative phase match. That is, coupling may occur when the total effective input waveguide propagation constant $\beta_{30}$ for input channel waveguide 30 is approximately equal to effective fiber-channel propagation constant $\beta_{34}$ for fiber-channel waveguide 34. Phase match is achieved when the sum of transmit SAW propagation constant $\kappa_t$ and input waveguide propagation constant $\beta_{30}$ is equal to fiber-channel propagation constant $\beta_{34}$.

Similarly, optical energy may only be transferred between fiber-channel waveguide 34 and output channel waveguide 50 under conditions of relative phase match between these waveguides. That is, coupling may occur when the total effective output waveguide propagation constant $\beta_{50}$ for output channel waveguide 50 is made approximately equal to effective fiber-channel propagation constant $\beta_{34}$ for fiber-channel waveguide 34.

Therefore, upon application of an appropriate receive SAW, having an acoustic wavelength of $\Lambda_r$, phase match is achieved and coupling between fiber-channel waveguide 34 and output channel waveguide 50 when the sum of receive SAW propagation constant $\kappa_r$ and fiber channel propagation constant $\beta_{34}$ is equal to output waveguide propagation constant output waveguide propagation constant $\beta_{50}$.

These conditions necessary for optical coupling, that is optical energy transfer, between input channel waveguide 30 and fiber-channel waveguide 34 and between fiber-channel waveguide 34 and output channel waveguide 50 may be summarized as follows:

$\kappa_t + \beta_{34} = \beta_{30}$ (transmit mode), $\kappa_r + \beta_{34} = \beta_{50}$ (receive mode).

FIG. 4 is a graph of fiber-channel propagation constant $\beta_{34}$, input waveguide propagation constant $\beta_{30}$ and output waveguide propagation constant $\beta_{50}$ as a function of optical free space wavelength $\lambda$ for optical coupler 10 which illustrates the effect of a selection of a series of SAW wavelengths which permit independent transfers of optical energy for both transmit and receive operations.

As shown in FIG. 4, at optical wavelengths of interest, in the absence of an appropriate SAW, fiber-channel propagation constant $\beta_{34}$, input waveguide propagation constant $\beta_{30}$ and output waveguide propagation constant $\beta_{50}$ are sufficiently different so that the phase mismatch between fiber-channel waveguide 34 and input channel waveguide 30, and the phase mismatch between fiber-channel waveguide 34 and output channel waveguide 50 prevents the transfer or coupling of any substantial amount of optical energy between the various waveguides.

However, at optical transmit wavelength $\lambda_t$ between $\lambda_{min}$ and $\lambda_{max}$ upon application of an appropriate SAW having an acoustic wavelength $\Lambda_t$, the sum of the resultant propagation constant $\kappa_t$ and fiber-channel propagation constant $\beta_{34}$ is equal to input waveguide propagation constant $\beta_{30}$. This results in a controllable coupling of optical energy from a particular processor 62, shown in FIG. 2, to common fiber optic data transmission loop 64 by application of a specific acoustic frequency SAW to the corresponding optical coupler 10.

Similarly, at optical receive wavelength $\lambda_r$ upon application of an appropriate SAW having an acoustic wavelength $\Lambda_r$, the sum of the resultant receive propagation constant $\kappa_r$ and fiber-channel propagation constant $\beta_{34}$ is equal to output waveguide propagation constant $\beta_{50}$. This results in a controllable coupling of optical energy from common fiber optic data transmission loop 64 to a particular processor 62 by application of a specific acoustic frequency SAW to the corresponding optical coupler 10.

In other words, when a particular processor 62 wants to transmit data in the form of optical energy to any other processor 62 connected to common fiber optic data transmission loop 64, it is only necessary for the transmitting processor 62 to apply the appropriate electrical signals via electrical connections 66 to its corresponding optical coupler 10 to stimulate transmit SAW transducer 38, shown in FIG. 1, at acoustic frequency whose wavelength is $\Lambda_t$. This activates transmit coupler 18 to permit the transfer of the data at optical wavelength $\lambda_t$.

Similarly, when a particular processor 62 wants to receive data in the form of optical energy from any other processor 62 connected to common fiber optic data transmission loop 64 it is only necessary for the receiving processor 62 to apply the appropriate electrical signals via electrical connections 66 to its corresponding optical coupler 10 to stimulate receive SAW transducer 48, at acoustic frequency whose wavelength is $\Lambda_r$, to activate receive coupler 20 to permit the transfer of the data at optical wavelength $\lambda_r$.

As may be noted from FIG. 4, within the range of optical wavelengths of interest between $\lambda_{min}$ and $\lambda_{max}$, the range of transmit SAW frequencies which produce propagation constants that couple fiber-channel waveguide 34 to input channel waveguide 30 is below and non-overlapping with the range of receive SAW frequencies which produce propagation constants that couple output channel waveguide 50 to fiber-channel waveguide 34. That is, $\kappa_t$max is less than $\kappa_r$min. In fact, as may be further noted from FIG. 4, additional independent transmit and receive functions may be provided.

That is, the application of multiple SAW's at frequencies which produce transmit propagation constants less than transmit propagation constant $\kappa_t$max will permit transfers of optical energy at multiple optical wavelengths between fiber-channel waveguide 34 and input channel waveguide 30 completely independent of any effect upon output channel waveguide 50.

Similarly, the application of multiple SAW's at frequencies which produce receive propagation constants between $\kappa_r$max and $\kappa_r$min will permit transfers of optical energy at multiple optical wavelengths between fiber-channel waveguide 34 and output channel waveguide 50 completely independent of any effect upon input channel waveguide 30.

What is claimed is:

1. An optical coupler, comprising:
   a planar optical medium;
   a first channel waveguide in the medium;
   a second channel waveguide in the medium having dissimilar propagation characteristics from the first channel waveguide; and
   means for propagating a surface acoustic wave along the waveguides having an acoustic wavelength selected to reduce the propagation dissimilarity between the waveguides and thereby to couple at least a substantial portion of optical energy of a corresponding optical wavelength between the waveguides.

2. An optical coupler as claimed in claim 1 wherein the controllable coupling means further comprises:
   means for adjusting the surface acoustic wave to vary the portion of the optical energy of the corresponding optical wavelength coupled between the waveguides.

3. An optical coupler as claimed in claim 1 wherein the controllable coupling means further comprises:
   means for propagating a series of surface acoustic waves along the waveguides having acoustic wavelengths selected to couple at least a substantial portion of the optical energy of each of a series of corresponding optical wavelengths between the waveguides.

4. An optical coupler as claimed in claim 3 wherein the controllable coupling means further comprises:
   means for adjusting selected surface acoustic waves to vary the portion of the optical energy of the corresponding optical wavelengths coupled between the waveguides.

5. An optical coupler as claimed in claim 1 wherein the first-channel waveguide is a fiber optic waveguide.

6. An optical coupler comprising: a planar optical medium;
   a first channel waveguide in the medium;
   a second channel waveguide in the medium having dissimilar propagation characteristics from the first channel waveguide;
   means for controllably coupling optical energy between the waveguides by reducing the propagation dissimilarity therebetween; and
   a third channel waveguide in the medium having substantially dissimilar propagation characteristics from the first and second channel waveguides.

7. An optical coupler as claimed in claim 6 wherein the controllable coupling means further comprises: means for controllably coupling optical energy between the first channel waveguide and the third channel waveguide by reducing the propagation dissimilarity there between.

8. An optical coupler as claimed in claim 7 wherein the controllable coupling means further comprises:
   means for controllably coupling optical energy between the first channel waveguide and the second channel waveguide and independently controllably coupling optical energy between the first channel waveguide and the third channel waveguide.

9. An optical coupler as claimed in claim 8 wherein the controllable coupling means further comprises:

means for propagating a surface acoustic wave along the waveguides having a first acoustic wavelength selected to couple at least a substantial portion of optical energy of a corresponding optical wavelength between the first channel waveguide and the second channel waveguide.

10. An optical coupler as claimed in claim 9 wherein the controllable coupling means further comprises:

means for propagating a second surface acoustic wave along the waveguides having an acoustic wavelength selected to couple at least a substantial portion of optical energy of a corresponding optical wavelength between the first channel waveguide and the third channel waveguide.

11. An optical coupler as claimed in claim 10 wherein the controllable coupling means further comprises:

means for propagating a first series of surface acoustic waves along the waveguides having acoustic wavelengths in a range selected to couple at least a substantial portion of optical energy of a corresponding range of optical wavelengths between the first channel waveguide and the second channel waveguide.

12. An optical coupler as claimed in claim 10 wherein the surface acoustic wave propagating means further comprises:

means for propagating a second series of surface acoustic waves along the waveguides having acoustic wavelengths in a range selected to couple at least a substantial portion of optical energy of a corresponding range of optical wavelengths between the first waveguide and the third channel waveguide.

13. An optical coupler as claimed in claim 12 wherein the first range of acoustic wavelengths does not overlap the second range of acoustic wavelengths.

14. An optical coupler as claimed in claim 12 wherein the first range of optical wavelengths overlaps the second range of optical wavelengths.

15. An optical coupler as claimed in claim 12 wherein the controllable coupling means further comprises:

means for adjusting the amplitude of at least one surface acoustic wave to vary the portion of the optical energy of the corresponding optical wavelength coupled between the waveguides.

16. An optical coupler as claimed in claim 9 wherein the controllable coupling means further comprises:

light emitting means for applying optical energy including the wavelength corresponding to the first acoustic wave to the first channel waveguide whereby a substantial portion of the optical energy so applied is coupled to the first waveguide from the second channel waveguide by the first acoustic surface wave.

17. An optical coupler as claimed in claim 11 wherein the controllable coupling means further comprises:

light emitting means for applying optical energy including a series of wavelengths corresponding to the first series of acoustic waves to the first channel waveguide whereby a substantial portion of the optical energy so applied is coupled to the first channel waveguide from the second channel waveguide by the first series of acoustic surface waves.

18. An optical coupler as claimed in claim 10 wherein the controllable coupling means further comprises:

means for applying optical energy including the wavelength corresponding to the second acoustic wave to the third channel waveguide whereby a substantial portion of the optical energy so applied is coupled to the third channel waveguide from the first channel waveguide by the second acoustic surface wave.

19. An optical Coupler as claimed in claim 18 further comprising:

means responsive to the third channel waveguide for detecting the optical energy coupled thereto.

20. An optical coupler as claimed in claim 19 wherein the detecting means comprises:

a photodetector, and means for deflecting the optical energy from the third channel waveguide to the photodetector.

21. An optical coupler as claimed in claim 12 wherein the controllable coupling means further comprises:

means for applying optical energy including a series of wavelengths corresponding to the second series of acoustic waves to the first channel waveguide whereby a substantial portion of the optical energy so applied is coupled to the third channel waveguide from the first channel waveguide by the second series of acoustic surface waves.

22. An optical coupler as claimed in claim 21 further comprising:

an array of photodetectors; and means responsive to the third channel waveguide for deflecting the selected wavelengths of optical energy from the third channel waveguide to selected photodetectors.

23. A distributed processor computer system, comprising:

a plurality of distributed processors;

a common fiber optic loop interconnecting the processors; and a plurality of optical couplers each interconnecting one of the distributed processors and the common optical loop;

means for operating the optic couplers to selectively couple a first range of optical signals from a selected distributed processor to the common optical loop; and means for operating the optic couplers to selectively couple a second range of optical signals from the common optical loop a selected distributed processor.

24. The distributed processor computer system claimed in claim 23 wherein the first range of optical signals does not overlap the second range of optical signals.

25. The distributed processor computer system claimed in claim 24 wherein the optical couplers each further comprise:

a plurality of channel waveguides having propagation characteristics sufficiently dissimilar propagation characteristics to prevent substantial optical energy coupling between; and wherein the optical coupler operating means further comprises:

means for applying surface acoustic waves to the guides to selectively couple optical energy of corresponding optical wavelengths between the waveguides and the common optical loop.

26. The computer system claimed in claim 25 further comprising:

means for altering the frequencies of the surface acoustic waves to alter the wavelengths of the optical energy coupled the waveguides and the common optical loop.

27. The computer system claimed in claim 25 further comprising:

means for altering the amplitudes of the surface acoustic waves to alter the portion of the spectrum of optical energy coupled between the waveguides and the common optical loop.

* * * * *